(12) United States Patent
Iwasaki et al.

(10) Patent No.: US 9,230,240 B2
(45) Date of Patent: Jan. 5, 2016

(54) CONTACT RELEVANCE BASED ON CONTEXT

(75) Inventors: Jill S. Iwasaki, San Diego, CA (US); Bennett M. King, San Diego, CA (US); Devarshi P. Shah, San Diego, CA (US); Padmapriya Jagannathan, San Diego, CA (US); Pooja Aggarwal, San Ramon, CA (US); Roger M. Ruuspakka, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 13/011,127

(22) Filed: Jan. 21, 2011

(65) Prior Publication Data

US 2012/0191777 A1    Jul. 26, 2012

(51) Int. Cl.
| | |
|---|---|
| *G06F 15/16* | (2006.01) |
| *G06Q 10/10* | (2012.01) |
| *H04W 8/18* | (2009.01) |
| *H04M 1/2745* | (2006.01) |
| *H04M 1/725* | (2006.01) |
| *H04W 4/02* | (2009.01) |
| *G06Q 50/00* | (2012.01) |

(52) U.S. Cl.
CPC .............. *G06Q 10/10* (2013.01); *G06Q 10/101* (2013.01); *G06Q 50/01* (2013.01); *H04M 1/274508* (2013.01); *H04M 1/274583* (2013.01); *H04M 1/72566* (2013.01); *H04M 1/72572* (2013.01); *H04W 4/028* (2013.01); *H04W 8/183* (2013.01)

(58) Field of Classification Search
CPC ..................... G06Q 30/0267; G06Q 30/0275
USPC .......................................................... 709/204
See application file for complete search history.

(56) References Cited

U.S. PATENT DOCUMENTS 7,330,895 B1 * 2/2008 Horvitz ......................... 709/227
7,336,779 B2 * 2/2008 Boyer et al. ............. 379/265.02
(Continued)

FOREIGN PATENT DOCUMENTS

| | | |
|---|---|---|
| CN | 101848266 A | 9/2010 |
| EP | 2113853 A1 | 11/2009 |

(Continued)

OTHER PUBLICATIONS

"Structural Analysis of Chat Messages for Topic Detection"—Dong et al, Nanyang Tech Univ., Aug. 2006 http://www.cnts.ua.ac.be/~walter/educational/material/chatMsgAnalysis06.pdf.*

(Continued)

*Primary Examiner* — Randy Scott
(74) *Attorney, Agent, or Firm* — Charles E. Eggers

(57) ABSTRACT

A method of determining a communications contact relevance for a user includes: analyzing stored contact information of a plurality of contacts with which the user can at least one of receive information from or transmit information to; analyzing context information relevant to likelihoods of imminent communication by the user with the contacts, the context information including information different from ones of the contacts with which the user most recently communicated, the context information further including present user context information and at least one of present context or historical context associated with each of the contacts, respectively; and determining the likelihoods of imminent communication between the user and the contacts based on the context information.

28 Claims, 8 Drawing Sheets

(56) References Cited

U.S. PATENT DOCUMENTS

| | | | |
|---|---|---|---|
| 7,580,363 B2* | 8/2009 | Sorvari et al. | 370/252 |
| 8,204,897 B1* | 6/2012 | Djabarov et al. | 707/767 |
| 8,332,748 B1* | 12/2012 | Karam | 715/246 |
| 2007/0230681 A1* | 10/2007 | Boyer et al. | 379/265.1 |
| 2008/0307306 A1* | 12/2008 | Pettinati et al. | 715/711 |
| 2009/0063467 A1* | 3/2009 | Abhyanker | 707/5 |
| 2010/0062753 A1 | 3/2010 | Wen et al. | |
| 2010/0076845 A1* | 3/2010 | Ramer et al. | 705/14.52 |
| 2010/0153504 A1* | 6/2010 | Will | 709/206 |
| 2010/0199287 A1 | 8/2010 | Boda et al. | |
| 2010/0217528 A1* | 8/2010 | Sato et al. | 701/301 |
| 2012/0110096 A1* | 5/2012 | Smarr et al. | 709/206 |

FOREIGN PATENT DOCUMENTS

| | | |
|---|---|---|
| JP | 2003281068 A | 10/2003 |
| JP | 2008510406 A | 4/2008 |
| JP | 2008236753 A | 10/2008 |
| WO | WO-2006018724 A1 | 2/2006 |
| WO | 2010040517 A1 | 4/2010 |

OTHER PUBLICATIONS

International Search Report and Written Opinion—PCT/US2012/022117—ISA/EPO—Aug. 26, 2013.
Supplementary European Search Report—EP12704466—Search Authority—Munich—Jan. 27, 2015.

* cited by examiner

FIG. 4

| Log | | | | | | 110 |
|---|---|---|---|---|---|---|
| Contact Name 114 | Date/Time 116 | Location | | Communication Type (Phone, email, text, social network) 120 | Connection Information | |
| | | A.T. 118 | Contact 120 | | | |
| 112 | | | | | | |
| 112 | | | | | | |
| 112 | | | | | | |

FIG. 5

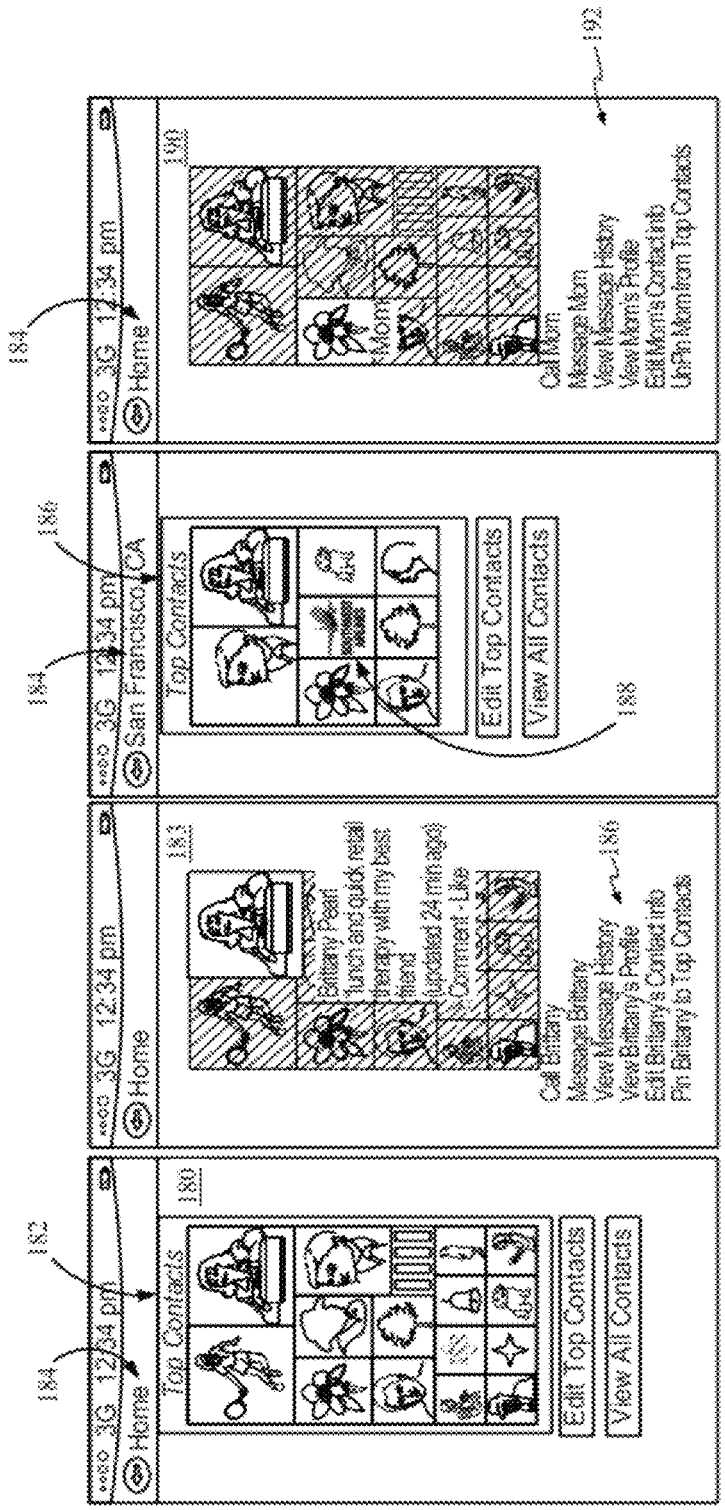

CONTACT RELEVANCE BASED ON CONTEXT

BACKGROUND

Users of communication devices often use these devices to communicate with other persons or entities for which the users have contact information stored. The stored information may be, for example, in a list of contacts. The contacts may be friends, family members, business associates, acquaintances, etc. and the stored information may include, for example, phone numbers, home and/or business addresses, email addresses, websites, birthdays, etc.

Contact lists may be organized manually by the user. The users may manually organize the contacts into standard categories such as "favorites," "business," "holiday cards," etc., or customized categories.

Contacts may be automatically organized according to communications with the contacts. For example, communication devices can automatically populate a "recently called" list indicating with which contacts communication has recently been had, e.g, in reverse chronological order.

SUMMARY

An example method of determining a communications contact relevance for a user includes: analyzing stored contact information of a plurality of contacts with which the user can at least one of receive information from or transmit information to; analyzing context information relevant to likelihoods of imminent communication by the user with the contacts, the context information including information different from ones of the contacts with which the user most recently communicated, the context information further including present user context information and at least one of present context or historical context associated with each of the contacts, respectively; and determining the likelihoods of imminent communication between the user and the contacts based on the context information.

Implementations of such a method may include one or more of the following features. The method further includes presenting a prioritized list of the contacts to the user based on the likelihoods of initiation. The prioritized list indicates combinations of contacts and communication types. The method further includes prompting the user to contact at least one of the contacts based on the context information. The prompting includes suggesting a communication type. The context information includes at least one of: user present location of the user, contact present location, contact historical location, time of day, day of week, day of year, holiday/non-holiday, a historical communication pattern of the user with at least some of the contacts, a historical communication type for communications between the user and a particular contact of the plurality of contacts, a calendared event, security settings associated with the plurality of contacts, frequencies of communication with each of the plurality of contacts, frequencies of communication with each of the plurality of contacts combined with location of the user, a relationship between the user and each of the plurality of contacts, type of contact, present active application of the user, a user preference, a contact's preference setting, or a contact's permission setting. The method further includes organizing stored communications based on the determined likelihoods. The context information includes information as to the contacts with which the user most recently communicated.

An example of an apparatus includes: a memory storing context information; and a processor communicatively coupled to the memory and configured to: analyze stored contact information of a plurality of contacts with which a user of the apparatus can at least one of receive information from or transmit information to; analyze the context information relevant to likelihoods of imminent communication by a user of the apparatus with the contacts, the context information including information different from ones of the contacts with which the user most recently communicated, the context information further including present user context information and at least one of present context or historical context associated with each of the contacts, respectively; and determine the likelihoods of imminent communication between the user and the contacts based on the context information.

Implementations of such an apparatus may include one or more of the following features. The processor is further configured to present a prioritized list of the contacts to the user based on the likelihoods of imminent communication. The context information includes at least one of: user present location of the user, contact present location, contact historical location, time of day, day of week, day of year, holiday/non-holiday, a historical communication pattern of the user with at least some of the contacts, a historical communication type for communications between the user and a particular contact of the plurality of contacts, a calendared event, security settings associated with the plurality of contacts, frequencies of communication with each of the plurality of contacts, frequencies of communication with each of the plurality of contacts combined with location of the apparatus, a relationship between the user and each of the plurality of contacts, type of contact, present active application of the apparatus, a user preference, a contact's preference setting, or a contact's permission setting. The processor is further configured to organize stored communications based on the determined likelihoods. The apparatus further includes a network interface communicatively coupled with the processor and wherein the processor is further configured to mine context information from a wide area network via the network interface.

An example of a computer program product residing on a non-transitory processor-readable medium includes processor-readable instructions configured to cause a processor to: analyze stored contact information of a plurality of contacts with which a user of the computer program product can at least one of receive information from or transmit information to; analyze context information relevant to likelihoods of imminent communication by the user with the contacts, the context information including information different from ones of the contacts with which the user most recently communicated, the context information further including present user context information and at least one of present context or historical context associated with each of the contacts, respectively; and determine the likelihoods of imminent communication between the user and the contacts based on the context information.

Implementations of such a computer program product may include one or more of the following features. The computer program product further includes instructions configured to cause the processor to present a prioritized list of the contacts to the user based on the likelihoods of initiation. The prioritized list indicates combinations of contacts and communication types. The computer program product further includes instructions configured to cause the processor to prompt the user to contact at least one of the contacts based on the context information. The instructions configured to cause the processor to prompt include instructions configured to cause the processor to suggest a communication type. The context information includes at least one of: user present location of the user, contact present location, contact historical location, time of day, day of week, day of year, holiday/non-holiday, a historical communication pattern of the user with at least some of the contacts, a historical communication type for communications between the user and a particular contact of the plurality of contacts, a calendared event, security settings associated with the plurality of contacts, frequencies of communication with each of the plurality of contacts, frequencies of communication with each of the plurality of contacts combined with location of the user, a relationship between the user and each of the plurality of contacts, type of contact, present active application of the user, a user preference, a contact's preference setting, or a contact's permission setting. The computer program product further includes instructions configured to cause the processor to organize stored communications based on the determined likelihoods. The context information includes information as to the contacts with which the user most recently communicated.

An example of a mobile telecommunications device includes: a memory storing context information; and means, communicatively coupled to the memory, for: analyzing stored contact information of a plurality of contacts with which a user of the device can at least one of receive information from or transmit information to; analyzing the context information relevant to likelihoods of imminent communication by a user of the apparatus with the contacts, the context information including information different from ones of the contacts with which the user most recently communicated, the context information further including present user context information and at least one of present context or historical context associated with each of the contacts, respectively; and determining the likelihoods of imminent communication between the user and the contacts based on the context information.

Implementations of such a device may include one or more of the following features. The means are further for presenting a prioritized list of the contacts to the user based on the likelihoods of imminent communication. The context information includes at least one of: user present location of the user, contact present location, contact historical location, time of day, day of week, day of year, holiday/non-holiday, a historical communication pattern of the user with at least some of the contacts, a historical communication type for communications between the user and a particular contact of the plurality of contacts, a calendared event, security settings associated with the plurality of contacts, frequencies of communication with each of the plurality of contacts, frequencies of communication with each of the plurality of contacts combined with location of the apparatus, a relationship between the user and each of the plurality of contacts, type of contact, present active application of the apparatus, a user preference, a contact's preference setting, or a contact's permission setting. The means are further for organizing stored communications based on the determined likelihoods. The device further includes a network interface communicatively coupled with the means and wherein the means are further for mining context information from a wide area network via the network interface.

Items and/or techniques described herein may provide one or more of the following capabilities. Less manual user input can be used to interact with a contacts list. Users can be prompted to communicate with a stored contact with whom the user is likely to want to communicate. Contacts can be organized and presented to a user according to likelihoods that the user will wish to communicate with the various contacts. While item/technique-effect pairs have been described, it may be possible for a noted effect to be achieved by means other than those noted, and a noted item/technique may not necessarily yield the noted effect.

BRIEF DESCRIPTION OF THE DRAWINGS

FIG. 4 block diagram of a table of contact information and associated context information.

FIG. 5 block diagram of a table of logged communication information.

FIGS. 8A-8C are examples of screen displays of an access terminal shown in FIG. 1.

FIG. 9 is another example of a screen display of an access terminal shown in FIG. 1.

DETAILED DESCRIPTION

Techniques are discussed herein for determining contact relevance based on context and providing indications of the contact relevance to a user. For example, information regarding the contacts stored in a mobile device are analyzed for likelihood of imminent communication based on context information. The context information includes information aside from and/or in addition to contacts most recently communicated with and favorites. For example, the user's present location, calendar events, historical communication patterns, as well as the user's contacts' present location, historical locations, can be analyzed relative to help determine which contacts the user is most likely to communicate with now and using which mode (e.g., phone, email, text message, social networking site). These examples, however, are not exhaustive.

Techniques described herein may be used for various wireless communication systems such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95 and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). A wireless communication network does not have all communications transmitted wirelessly, but is configured to have at least some communications transmitted wirelessly.

Figure 1:
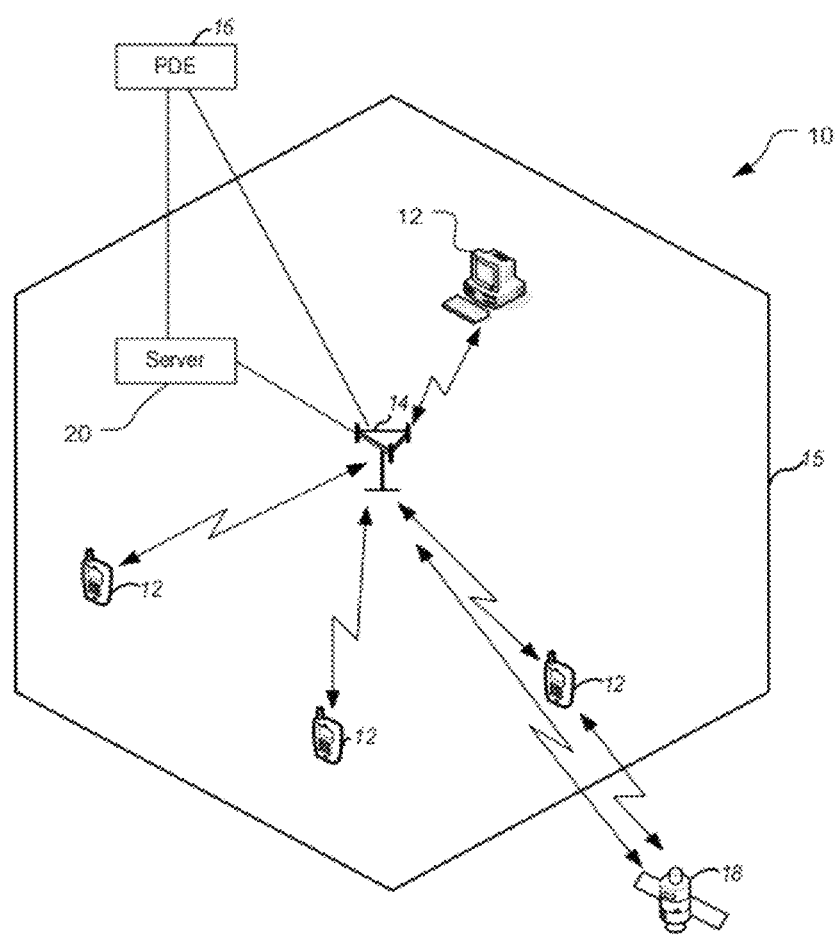
FIG. 1 is a schematic diagram of a communication and positioning network.

Referring to FIG. 1, a position location system and telecommunication network 10 includes mobile access terminals (ATs) 12 (also called a mobile device or mobile station), a base transceiver station (BTS) 14 (also called a base station), a position determining entity (PDE) 16, a satellite 18, and a server 20. The system 10 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a SC-FDMA signal, etc. Each modulated signal may be sent on a different carrier. The ATs 12 can be wirelessly connected to the BTSs 14 and/or connected via wireline to the server 20. While the server 20 is shown as being disposed inside the cell 15, the server 20 may be located remotely from the cell 15.

The BTS 14 can wirelessly communicate with the ATs 12. The BTS 14 may also be referred to as an access point, an access node (AN), a Node B, an evolved Node B (eNB), etc. The BTS 14 can be configured to communicate with the ATs 12 via multiple carriers. The BTS 14 can provide communication coverage for a respective geographic area, for example, the cell 15.

The ATs 12 may be referred to as mobile stations, mobile devices, user equipment (UE), or subscriber units. The ATs 12 here are cellular phones, but could also include other wireless communication devices, personal digital assistants (PDAs), other handheld devices, laptop computers, notebook computers, desktop computers, etc.

The satellite 18 can be part of a global navigation satellite system, e.g., the Global Positioning System (GPS), the GLObal NAvigation Satellite System (GLONASS), or the Galileo system. Here, the satellite 18 is a GPS satellite with a transmitter capable of transmitting information for use in determining the position of the AT 12. The AT 12 includes a GPS receiver capable of wirelessly receiving position information from the satellite 18.

Figure 2:
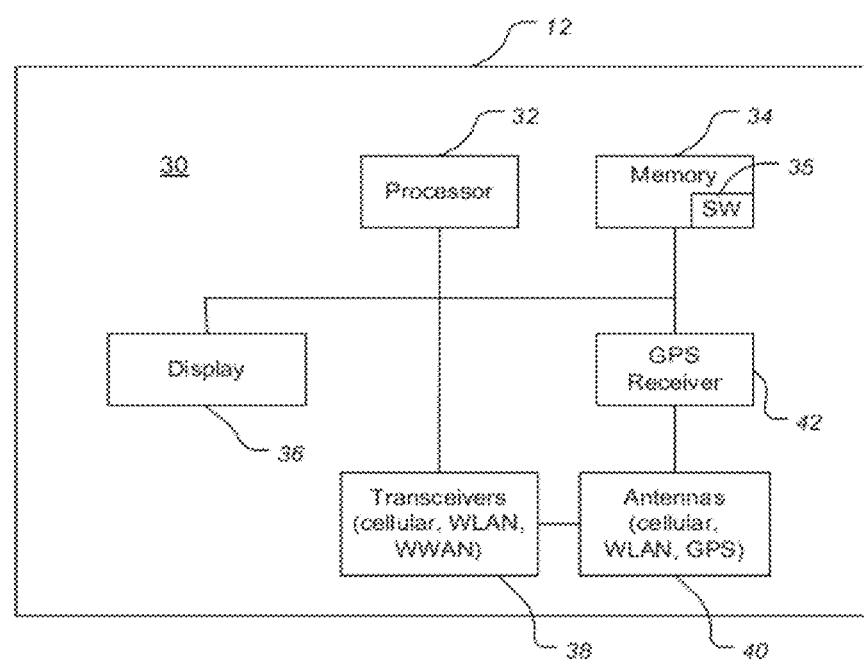
FIG. 2 is a block diagram of an access terminal of the network shown in FIG. 1.

Referring to FIG. 2, an exemplary one of the ATs 12 comprises a computer system 30 including a processor 32, memory 34, a display 36, transceivers 38, antennas 40, and a GPS receiver 42. The AT 12 is configured to analyze would-be contact entities, assess the likelihoods of imminent communication with the entities, and present a user of the mobile device with a list and/or prompts for communication with a subset of the entities based on the likelihoods. Alternatively, or additionally, the server 20 can perform this analysis and assessment, convey information to the AT 12, which is configured to use this information to present the user with the list and/or prompts.

The processor 32 is preferably an intelligent hardware device, e.g., a central processing unit (CPU) such as those made by Intel® Corporation or AMD®, a microcontroller, an application specific integrated circuit (ASIC), etc. The memory 34 includes random access memory (RAM) and read-only memory (ROM). The memory 34 stores a computer program product comprising computer-readable, computer-executable software code 35 containing instructions that are configured to, when executed, cause the processor 32 to perform various functions described herein. Alternatively, the software 35 may not be directly executable by the processor 32 but configured to cause the processor 32, e.g., when the instructions are compiled and executed, to perform the functions described.

The display 36 can be any of various types of displays, either now known or later developed. For example, the display 36 can be a liquid crystal display (LCD) that may or may not be touch sensitive. The display 36 preferably has a size and a resolution such that indications of multiple contacts from a stored set of contacts associated with the AT 12 can be presented to the user simultaneously by the display 36.

Although the AT 12 could include only one transceiver 38 and one antenna 40, the AT 12 preferably, as assumed below, includes multiple transceivers 38 and multiple antennas 40. The transceivers 38 are configured to communicate through corresponding antennas 40 with the BTS 14, WLAN (wireless local area network) access points, the satellite 18, WWAN (wireless wide area network) access points, or other appropriate device for use in determining the position of the AT 12. The transceivers 38 may include, e.g., far-field communication transceivers such as GSM, CDMA, LTE, and WiMAX transceivers, near-field communication transceivers such as WLAN, Bluetooth, and UWB transceivers, and/or broadcast receivers such as mobile TV (MediaFlo, DVB-H) receivers. The GPS receiver 42 is configured to process GPS signals received via a GPS antenna of the antennas 40 to determine a position of the mobile device 12, e.g., in conjunction with the processor 32 and the memory 34.

Figure 3:
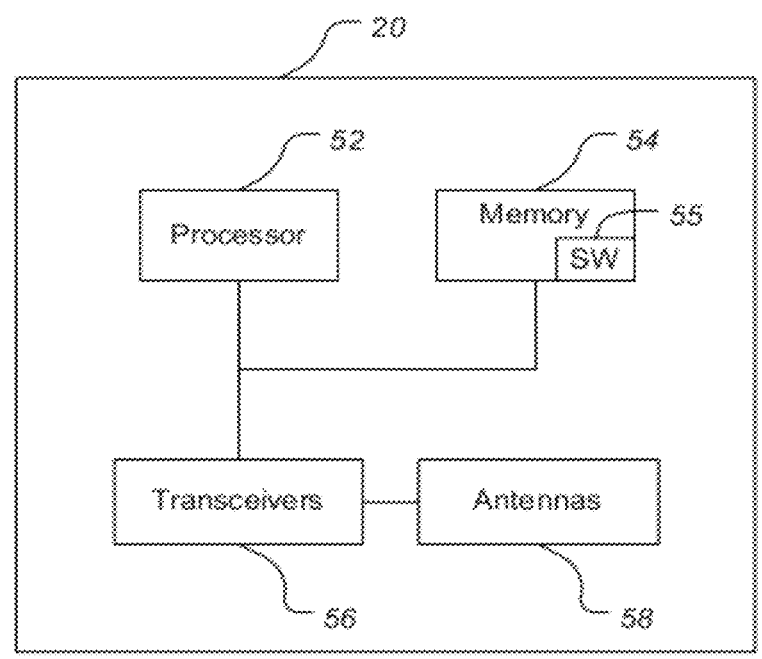
FIG. 3 is a block diagram of a server shown in FIG. 1.

Referring to FIG. 3, the server 20 comprises a computer system including a processor 52, memory 54, transceivers 56, and an antenna 58. The processor 52 is preferably an intelligent hardware device, e.g., a central processing unit (CPU) such as those made by Intel® Corporation or AMD®, a microcontroller, an application specific integrated circuit (ASIC), etc. The memory 54 includes random access memory (RAM) and read-only memory (ROM). The memory 54 stores computer-readable, computer-executable software code 55 containing instructions that are configured to, when executed, cause the processor 52 to perform various functions described herein. Alternatively, the software 55 may not be directly executable by the processor 52 but configured to cause the processor 52, e.g., when the instructions are compiled and executed, to perform the functions described. The transceivers 56 are configured to communicate bi-directionally with the BTS 14 through the antenna 58 and to communicate bi-directionally with the PDE 16 through a wired connection.

Figure 4:
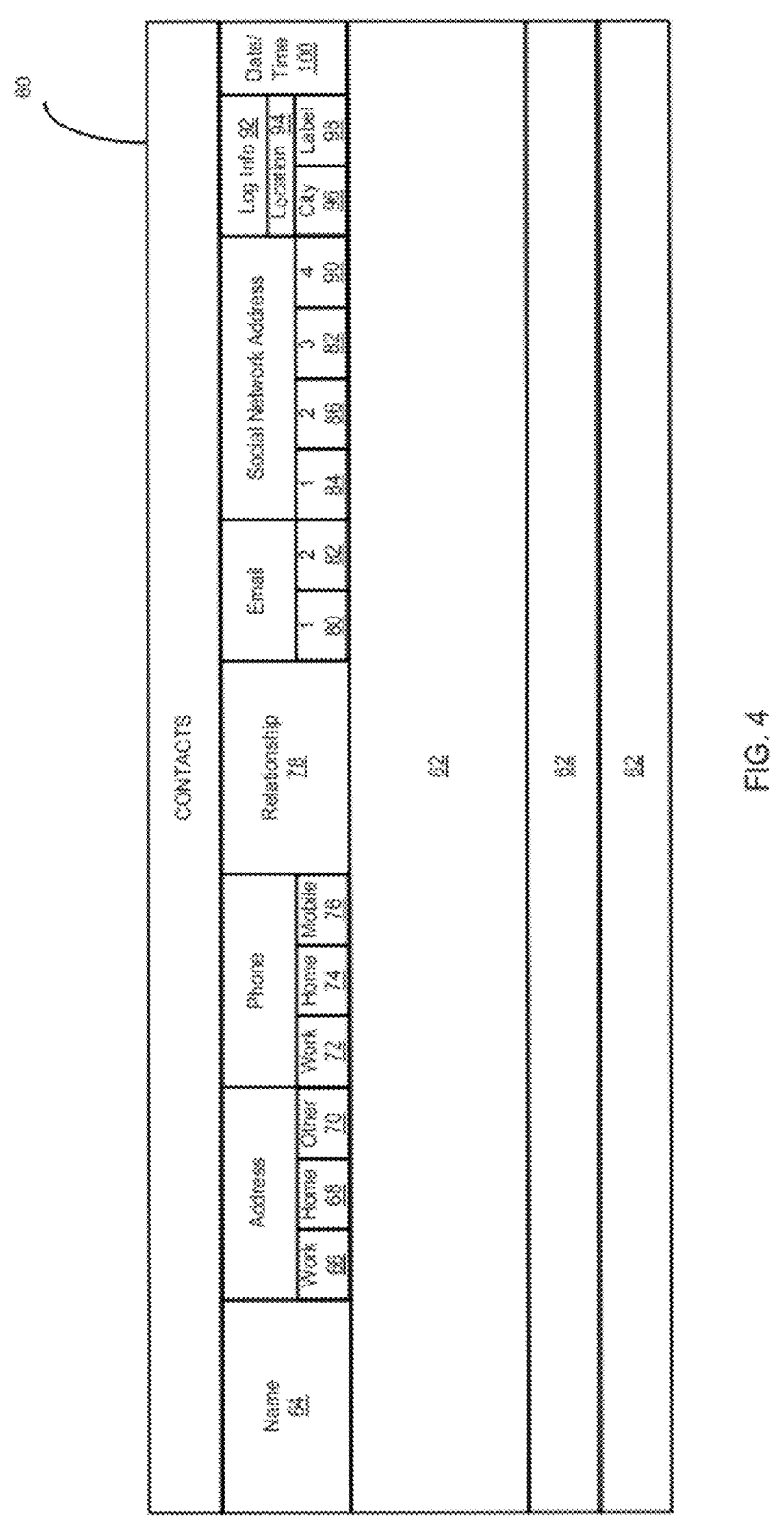

Referring to FIGS. 4-5, with further reference to FIGS. 2-3, the memories 34, 54 store databases of information. These databases may include similar types of information in the two memories 34, 54, may include portions with sets of information different from other portions of the same memory and/or different than portions of the other memory.

For example, the memory 34 stores a table 60 that includes a list of contacts in records 62. Each of the records 62 provides fields for the contact's name 64, work address 66, home address 68, other address 70, work phone number 72, home phone number 74, mobile phone number 76, relationship (e.g., to the user) 78, email addresses 80, 82, social networking site addresses 84, 86, 88, 90, and log information 92 including the user's location 94, including city 96 and location label 98 (e.g., contact person's address, a store name, or other label such as a park name, zip code, etc.), and corresponding date and time 100. Other fields could be used and the quantities of fields, e.g., three address fields, three phone number fields, two email address fields, and four social network site fields, are given as an example as other quantities of any of such fields may be used. The date and time information 100 corresponds to the location information 94 to indicate on what date and at what time the AT 12 was at the indicated location.

The table 60 provides a universal contact list of contacts (i.e., entities such as persons, businesses, etc.) that the user of the AT 12 has stored. This list may be presented to the user through the display 36 in a variety of ways, e.g., alphabetically. The table 60 can also be filtered and organized and a filtered, organized list provided to the user.

A log 110 is stored by the memory 54 of the server 20 providing records 112 of context information for the user's contacts. This information can be added by the user over time, or may be provided or downloaded or otherwise obtained (e.g., by mining a wide area network such as the Internet), e.g., when a new contact is added. The log 110 includes fields for contact name 114, date/time 116, AT location 118 and contact's location 120, communication type 122, and connection information. The date and time 116 are stored for each new entry for location or contact type. The contact location 120 can be obtained and stored in a variety of ways, e.g., periodically (e.g., daily), periodically in response to being further than a threshold distance from the contact's home or typical location, for each region visited outside of a typical region for the contact, etc. The region visited could be any of a variety of resolutions such as each zip code, city, state, and/or country once the contact is outside the contact's typical region, e.g., home city or county. The location information 118, 120 can be obtained using different location techniques such as GPS. The location information 120 can provide a GPS trace of the contact's movement, i.e., historical location over time of the contact. The AT location 118 and communication type 122 are preferably only stored for times corresponding to a communication with the contact. Thus, the AT's location is logged when the AT 12 either sends information to or receives information from the contact. Further, the communication type 122, such as phone, email, text message, social networking site message, and the connection information 124, such as phone number, email address, website address, are logged when the AT 12 communicates with the contact.

Figure 6:
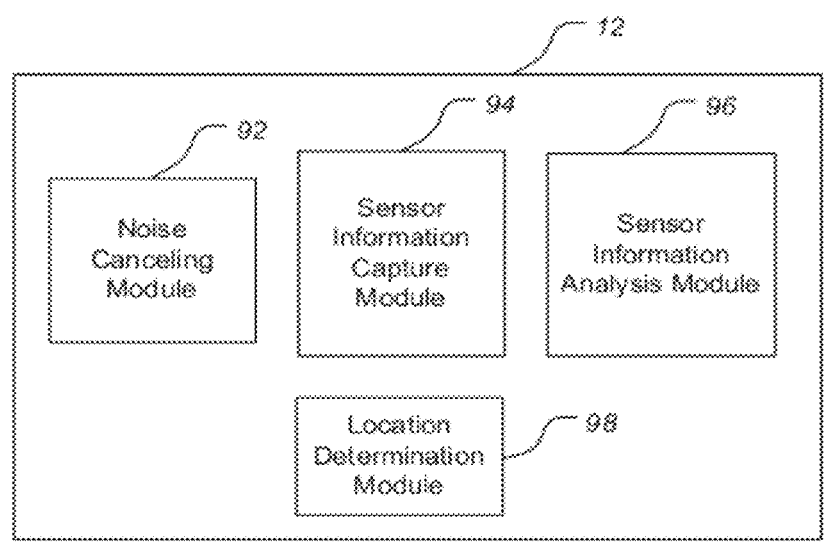
FIG. 6 is a block diagram of functional blocks of an access terminal shown in FIG. 1.

Referring to FIG. 6, the AT 12 (or server 20) includes a context module 132, a GPS module 134, and a calendar module 136. As shown, the modules 132, 134, and/or 136 are part of the AT 12. These modules, however, may be part of the server 20. Further, portions of the modules 132, 134, and/or 136 may be in the AT 12 while other portions of the modules 132, 134, and/or 136 may be in the server 20. For the discussion below, however, it is assumed that all of the modules 132, 134, 136 are in the AT 12.

The GPS module 134 is configured to determine the location of the AT 12 and provide this information for storage in the table 60. The GPS module 134 uses known GPS techniques to determine the location of the AT 12 on an ongoing basis, e.g., periodically. The module 134 may continuously determine the AT's position while the module 134 is activated while storing information in the table 60 less frequently, e.g., periodically such as hourly, semi-daily, daily, etc. The location information is stored in the location field 94 with corresponding date and time 100.

The calendar module 136 is configured to provide a calendar for the user of the AT 12. The calendar module 136 can store indications of appointments and/or other calendar events entered by the user or input into the user's calendar by other means, such as by the user accepting a meeting request or an event indication otherwise received by the calendar module 136. The calendar module 136 can provide access to the user's calendar by the context analysis module 132.

The context analysis module 132 is configured to analyze information stored in the context table 60, the log 110, and other portions of the memory 34 such as the calendar information stored by the calendar module 136. The context analysis module 132 is further configured to analyze information external to the memory 34, such as information obtained via a wide area network such as the Internet using an appropriate application program interface. For example, the module 132 can use IMAP (Internet message access protocol) for accessing Gmail™. As another example, the context analysis module 132 can mine social networks over the Internet to determine information relevant to likelihoods that the user of the AT 12 will communicate with the contact stored in the table 60. The module 132 can analyze the information obtained over the Internet such as from social networking sites to adjust parameters and/or a priority list, discussed below, based on information obtained from the social networks. For example, the module 132 can determine the frequency of communication (e.g., using phone, email, social networking sites such as Facebook®, MySpace®, etc.) between (from or to) the AT 12 and other entities.

The context analysis module 132 is configured to analyze context information in order to determine a ranking of likelihoods of imminent communication between the user of the AT 12 and any of the stored contacts in the table 60 or even other potential contacts not stored in the table 60. The context analysis module 132 is configured to analyze the context information to develop a contact-relevance score for each of the would-be contacts. This score is a function of multiple criteria and can be represented as $$S=f(c_1,c_2,c_3,\ldots,c_n)$$

where S is the relevance score, and $c_1$-$c_n$ are the criteria. The criteria may include one or more of the following:

1. frequency with which the user has communicated with a contact at or near the current time;
2. frequency with which the user has interacted with a contact at or near the current day of week;
3. frequency with which the user has interacted with a contact at or near the current location;
4. frequency with which the user has interacted with a contact in general;
5. frequency with which the user has interacted with a contact when other individuals are present nearby;
6. the nature (type or mode) of prior interactions (e.g., phone call, SMS message, IM message, Facebook® wallpost, email, rejected call followed by a text message, etc.);
7. relationship with the contact (e.g., spouse, son, daughter, co-worker, friend, etc.);
8. relationship with the contact (e.g., emergency contact) coupled with the current location of the AT 12 (e.g., high-crime area);
9. frequency with which the user has interacted with a contact after having called/interacted with another contact (i.e., communication patterns or communication chains);
10. calendar status, e.g., whether the user has a meeting with one or more of the contacts near the current time;
11. historical pattern/frequency and location combination, e.g., have never called X when in SF, therefore next SF trip, don't weight X highly;
12. location/distance relative to user's current location;
13. possession of relevant information;

14. contact's historical location relative to user's current location; and
15. others.

The context analysis module 132 can combine the various criteria in a variety of manners. The criteria may be summed, multiplied, some criteria summed and others multiplied, or otherwise combined. Further, the criteria may be equally weighted (or not weighted), or may be unequally weighted to emphasize some criteria over other criteria, may have the weightings of the various criteria changed depending on the time or other factors, etc. For example, frequency of communication may receive a lower weighting based on the time since the last communication with that contact. Thus, even if the frequency of communication with the particular contact is historically high, this factor may receive a lower weighting if the most recent communication with that contact exceeds a threshold time, and may receive even lower weighting upon the most recent communication exceeding further thresholds. As another example, the presence of a particular contact in the calendar of the user of the AT 12 may be heavily weighted over other criteria. The application in use by the AT 12 may also affect the weightings or other calculations of the contact-relevance score. For example, if the user of the AT 12 is using the phone versus email versus text messaging, the weightings of the relevance score factors may change, e.g., depending upon the usual mode or type of communication with the various contacts. As another example, the mode of communication with a particular contact may be more highly weighted based upon the present application in use. For example, if the user is presently using a restaurant recommendation application such as Yelp®, then the weightings could help prioritize those contacts with relevant information. In this case, relevant information could be, e.g., frequency of visit by a contact to the restaurant type that the user is presently looking for, amount of interest indicated by a particular contact in that type of restaurant, existence of reviews by the contact of that restaurant type or the particular restaurant that the user is presently researching, etc. Further, the context analysis module 132 can develop different priorities based on the information or type of communication sought by the user. For example, if the user is looking to have a live communication with a contact, then the priority may be different than if the user only wishes to see stored reviews by the user's contacts.

With respect to call pattern analysis, the context analysis module 132 can develop different priorities or likelihoods of imminent communication with a contact based on historical patterns of communication. For example, if the user frequently sends a text message to the user's stockbroker immediately after a communication with a particular one of the user's friends, then the stockbroker can be given a higher weighting or likelihood of communication if the user is presently communicating with the particular friend. The context analysis module 132 can cause the user to be prompted to contact the stockbroker upon the termination of the communication with the particular friend. As another example, if the user frequently communicates with a particular contact during meetings, then the analysis module 132 can give a higher weighting to that particular contact during any future meetings indicated by the user's calendar.

With respect to historical pattern/frequency and location combination, the module 132 can influence one or more of the relevance score weightings depending upon the user's communication patterns at different locations. For example, if the user has never called contact X when in San Francisco even though contact X lives in San Francisco and has received a higher weighting for relative location/distance, then the module 132 can adjust the weighting such that during the user's next San Francisco trip, the relative location/distance criterion in contact X's relevance score will receive a lower weighting than before.

The context analysis module 132 can further reorganize prior communications stored in the memory 34 based on the context. For example, if the user is presently communicating over the Internet with a bookseller's website, then prior communications received from that bookseller, or other booksellers, can be more heavily weighted. For example, emails received from a bookseller can be moved to the top or near to the top of a displayed list of emails, e.g., in another open window or when the user changes from viewing the bookseller website to viewing the user's stored emails.

The context analysis module 132 can further analyze the substance of communications between the user and other entities to help determine likelihood of future communication. For example, if the user of the AT 12 is presently reading an email, the context analysis module 132 can analyze the words contained in the email being read to determine weightings to give to contacts that the user may wish to communicate with. For example, if the user is reading an email regarding books, the context analysis module 132 can more heavily weight bookseller contacts and communications to effect a move of the contact information of the user's favorite bookseller to the top of the contacts list and/or to reorganize prior communications, e.g., to move emails received from the user's favorite bookseller to the top of a list of displayed emails.

Figure 7:
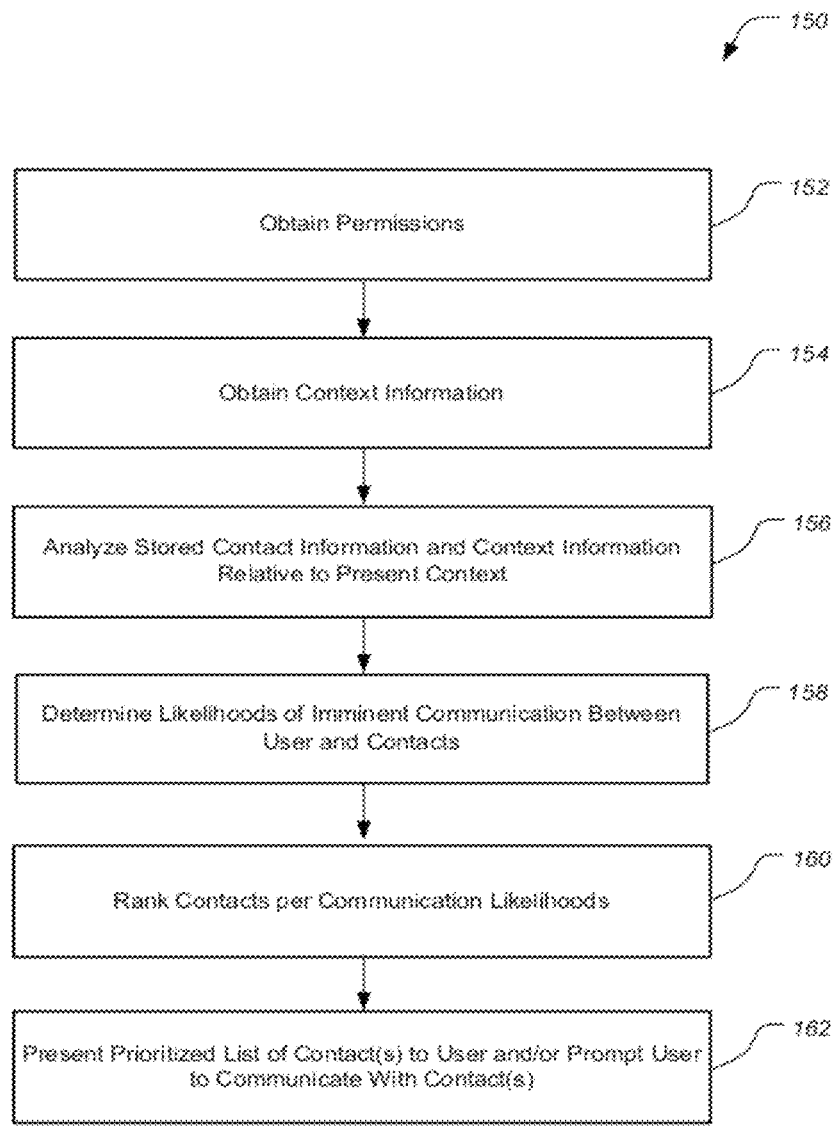
FIG. 7 is a block flow diagram of a process of determining communication contact relevance.

Referring to FIG. 7, with further reference to FIGS. 1-6, a process 150 of determining communication contact relevance includes the stages shown. The process 150 is, however, an example only and not limiting. The process 150 can be altered, e.g., by having stages added, removed, or rearranged.

At stage 152, permissions/privacy settings and/or preferences are obtained. The user of the AT 12 and/or the user's contacts provide indications of permissions/privacy settings and/or preference settings for various functions and features. For example, the user may wish to set a certain person or entity, such as the person's mother or father, as the default highest priority contact at all times. Further, some of the contacts may not wish the AT 12 or the server 20 to be able to log the contact's location.

At stage 154, present context information is obtained. The context analysis module 132 determines the user's present location via information from the GPS module 134, analyzes stored calendar information provided by the calendar module 136, determines the present day and time, analyzes any present communications by the AT 12, etc.

At stage 156, the context analysis module 132 analyzes stored contact information and context information relative to the present context. The analysis module 132 analyzes the information in the contacts table 60 as well as the log 110. The module 132 further analyzes information as appropriate beyond the AT 12, such as by mining applications over the Internet (e.g., email applications, social networking websites, etc.). The analysis module 132 also analyzes the present date, time, location of the AT 12, frequencies of communication with the contacts, modes of communication with the contacts, and other factors for determining the contact-relevance scores.

At stage 158, the context analysis module 132 uses the information analyzed at stage 156 to determine contact relevance scores. The module 132 determines scores for each of the contacts stored in the table 60 as well as identifying other possibly relevant contacts and determining a score for each of those contacts as well. The module 132 determines any dynamic weightings, e.g., based on time of day, day of week, current communication mode if any, current contact in communication with if any, etc. The module 132 applies the weightings to the score criteria, and combines the weighted criteria to arrive at scores for the contacts.

At stage 160, the context analysis module 132 ranks the contacts by communication likelihood. The analysis module 132 organizes the contacts from the table 60 and other would-be contacts according to their contact-relevance scores. The rankings may be dependent upon the particular application accessed by the user of the AT 12.

At stage 162, the context analysis module 132 presents the prioritized list of contacts to the user and/or prompts the user to communicate with one or more of the contacts. The analysis module 132 provides information via the display 136 to the user of the AT 12 to prompt the user to communicate with the highest-ranked contacts and/or to provide quick access for communication with the highest-ranked contacts without prompting the user. The displayed list may take a variety of forms, such as text indications, graphical indications, etc. The indications may directly link the user to a particular form of contact such as phone, text messaging, email, etc. or may provide a link to a further display that provides more detailed options of communication forms.

Case Examples

Referring to FIGS. 8A-8C, an example of an implementation of the techniques described above is shown. In this example, the display 36 is showing a contacts page 180 including a top contacts list 182 for the user. The user's present location is "home" as indicated by a location indicator 184. The user's most likely contacts for imminent communication as determined by the context analysis module 132 are provided in the top contacts list 182. In this example, the user, Kate, is having lunch soon with some of her friends. As the time for the event on Kate's calendar is near, those friends attending the lunch have become more relevant contacts as it is thus more likely that Kate will call or text message one of them. Kate's best friend Brittany is both an invitee to the lunch and Kate's friend and thus is in the top contacts list 182, indeed being at the top of the top contacts list 182. Other friends attending the lunch will also have more relevance in this context and are prioritized according to other factors such as how often Kate calls, texts, or otherwise interacts with them.

Referring to FIG. 8B in particular, the user, Kate, has selected the icon for her friend Brittany. In response, the processor 32 has caused the display 36 to show a detail contact page 183 highlighting Brittany's icon and providing more details regarding Brittany and options for communicating with her or viewing information related to her. As shown, there are links 186 allowing Kate to call Brittany, message Brittany, view message history, view Brittany's profile, edit Brittany's contact information, and pin Brittany to the top contacts list 182.

Referring to FIG. 8C, the top contacts list 182 has been reorganized. Kate is now in San Francisco as indicated by the location indicator 184 on vacation. This is planned in her calendar and confirmed by her GPS information provided by the GPS module 134. Given her present location, her friends that live in the area have become more relevant contacts and the context analysis module 132 has caused the display 36 to show more geographically-relevant contacts, providing the opportunity for Kate to more easily communicate with them. As shown, different ones of Kate's contacts are now provided in the state of the list 182 versus the state of the list 182 as shown in FIG. 8A. Further, an icon 188 for Southwest Airlines® is also provided by the display 36. The context analysis module 132 determined from Kate's stored communications that she used Southwest Airlines® for travel to San Francisco and thus is likely to want to communicate with this airline's website, e.g., to check her flight status, check in, print her boarding pass, etc. When Kate returns home, the contacts shown in the list 182 will receive lower weightings and thus may no longer be as relevant to her daily life and thus may no longer be provided in the top contacts list 182.

Referring to FIG. 9, Kate has provided a user preference setting of having her mom be her top priority contact regardless of other context. Thus, as shown, the display 36 shows that Kate is home as indicated by the location indicator 184 and her contacts page 190 provides a top contacts list 192 with an icon 194 indicating her mom being highlighted or otherwise distinguished from other contacts icons. The contacts page 190 also provides various links 192 for modes in which to communicate with her mom.

Other examples and implementations are within the scope and spirit of the disclosure and claims. For example, while the description above focused on mobile apparatus and context including location, stationary apparatus such as desktop computers may also be used and context information used to adjust contact information including ordering of options for future communications and/or ordering of stored communications.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various illustrative logical blocks, modules, and circuits described may be implemented or performed with a general purpose processor, a digital signal processor (DSP), an application specific integrated circuit (ASIC), a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

Various changes, substitutions and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

Further, more than one invention may be disclosed.

What is claimed is:

1. A method of determining a communications contact relevance for a user, the method comprising:
   analyzing stored contact information of for contacts with which the user can at least one of receive or transmit information;
   analyzing context information relevant to likelihoods of imminent communication by the user with the contacts, the context information including information different from ones of the contacts with which the user most recently communicated, the context information further including the user's present context information and contacts context information including at least one of present context or historical context associated with each of the contacts, respectively; and
   determining the likelihoods of imminent communication between the user and the contacts based on an analysis of the present context information of the user, including the user's present location determined using a satellite-based location determination system and frequency with which the user has interacted with one or more of the contacts at or near the user's present location, relative to the contacts context information associated with the each of the contacts in order to reorganize a contact list of the contacts according to the determined likelihoods of imminent communication between the user and the contacts.

2. The method of claim 1 further comprising presenting a prioritized list of the contacts to the user based on the likelihoods of imminent communication.

3. The method of claim 2 wherein the prioritized list indicates combinations of at least some of the contacts and communication types.

4. The method of claim 1 further comprising prompting the user to contact at least one of the contacts based on the context information.

5. The method of claim 4 wherein the prompting includes suggesting a communication type.

6. The method of claim 1 wherein the context information includes at least one of: contact present location, contact historical location, time of day, day of week, day of year, holiday/non-holiday, a historical communication pattern of the user with at least some of the contacts, a historical communication type for communications between the user and a particular contact of the contacts, a calendared event, security settings associated with the contacts, frequencies of communication with each of the contacts, the frequencies of communication with each of the contacts combined with location of the user, a relationship between the user and each of the contacts, type of contact, present active application of the user, a user preference, a contact's preference setting, or a contact's permission setting.

7. The method of claim 1 further comprising organizing stored communications based on the determined likelihoods of imminent communication.

8. The method of claim 1 wherein the context information includes information as to the contacts with which the user most recently communicated.

9. The method of claim 1, wherein analyzing context information comprises:
   analyzing content of a present communication reviewed by the user to determine weightings to give to at least one of the contacts that the user may wish to communicate with based on substance of the content of the present communication.

10. The method of claim 1, wherein the contacts context information comprises a movement trace of at least one of the contacts, determined using a satellite-based positioning system, to determine historical location over time of the at least one of the contacts.

11. An apparatus comprising:
    a memory storing context information; and a processor communicatively coupled to the memory and
configured to:
  analyze stored contact information for contacts with
    which a user of the apparatus can at least one of
    receive or transmit information;
  analyze the context information relevant to likelihoods
    of imminent communication by a user of the apparatus with the contacts, the context information including information different from ones of the contacts
    with which the user most recently communicated, the
    context information further including the user's
    present context information and contacts context
    information including at least one of present context
    or historical context associated with each of the contacts, respectively; and
  determine the likelihoods of imminent communication
    between the user and the contacts based on an analysis
    of the present context information of the user, including the user's present location determined using a
    satellite-based location determination system and frequency with which the user has interacted with one or
    more of the contacts at or near the user's present
    location, relative to the contacts context information
    associated with the each of the contacts in order to
    reorganize of a contact list of the contacts according to
    the determined likelihoods of imminent communication between the user and the contacts.

12. The apparatus of claim 11 wherein the processor is further configured to present a prioritized list of the contacts to the user based on the likelihoods of imminent communication.

13. The apparatus of claim 11 wherein the context information includes at least one of: contact present location, contact historical location, time of day, day of week, day of year, holiday/non-holiday, a historical communication pattern of the user with at least some of the contacts, a historical communication type for communications between the user and a particular contact of the contacts, a calendared event, security settings associated with the contacts, frequencies of communication with each of the contacts, the frequencies of communication with each of the contacts combined with location of the apparatus, a relationship between the user and each of the contacts, type of contact, present active application of the apparatus, a user preference, a contact's preference setting, or a contact's permission setting.

14. The apparatus of claim 11 wherein the processor is further configured to organize stored communications based on the determined likelihoods of imminent communication.

15. The apparatus of claim 11 further comprising a network interface communicatively coupled with the processor, and wherein the processor is further configured to mine the context information from a wide area network via the network interface.

16. A computer program product residing on a non-transitory processor-readable medium and comprising processor-readable instructions configured to cause a processor to:
  analyze stored contact information for contacts with which
    a user of the computer program product can at least one
    of receive or transmit information;
  analyze context information relevant to likelihoods of
    imminent communication by the user with the contacts,
    the context information including information different
    from ones of the contacts with which the user most
    recently communicated, the context information further
    including the user's present context information and
    contacts context information including at least one of
    present context or historical context associated with
    each of the contacts, respectively; and
  determine the likelihoods of imminent communication
    between the user and the contacts based on an analysis of
    the present context information of the user, including the
    user's present location determined using a satellite-based location determination system and frequency with
    which the user has interacted with one or more of the
    contacts at or near the user's present location, relative to
    the contacts context information associated with the
    each of the contacts in order to reorganize a contact list
    of the contacts according to the determined likelihoods
    of imminent communication between the user and the
    contacts.

17. The computer program product of claim 16 further comprising further processor-readable instructions configured to cause the processor to present a prioritized list of the contacts to the user based on the likelihoods of imminent communication.

18. The computer program product of claim 17 wherein the prioritized list indicates combinations of at least some of the contacts and communication types.

19. The computer program product of claim 16 further comprising further processor-readable instructions configured to cause the processor to prompt the user to contact at least one of the contacts based on the context information.

20. The computer program product of claim 19 wherein the further processor-readable instructions configured to cause the processor to prompt include additional processor-readable instructions configured to cause the processor to suggest a communication type.

21. The computer program product of claim 16 wherein the context information includes at least one of: contact present location, contact historical location, time of day, day of week, day of year, holiday/non-holiday, a historical communication pattern of the user with at least some of the contacts, a historical communication type for communications between the user and a particular contact of the contacts, a calendared event, security settings associated with the contacts, frequencies of communication with each of the contacts, the frequencies of communication with each of the contacts combined with location of the user, a relationship between the user and each of the contacts, type of contact, present active application of the user, a user preference, a contact's preference setting, or a contact's permission setting.

22. The computer program product of claim 16 further comprising further processor-readable instructions configured to cause the processor to organize stored communications based on the determined likelihoods of imminent communication.

23. The computer program product of claim 16 wherein the context information includes information as to the contacts with which the user most recently communicated.

24. A mobile telecommunications device comprising:
  a memory storing context information; and
  means, communicatively coupled to the memory, for:
    analyzing stored contact information for contacts with
      which a user of the device can at least one of receive
      or transmit information;
    analyzing the context information relevant to likelihoods of imminent communication by a user of the
      mobile telecommunications device with the contacts,
      the context information including information different from ones of the contacts with which the user most
      recently communicated, the context information further including the user's present context information
      and contacts context information including at least one of present context or historical context associated with each of the contacts, respectively; and determining the likelihoods of imminent communication between the user and the contacts based on an analysis of the present context information of the user, including the user's present location determined using a satellite-based location determination system and frequency with which the user has interacted with one or more of the contacts at or near the user's present location relative to the contacts context information associated with the each of the contacts in order to reorganize a contact list of the contacts according to the determined likelihoods of imminent communication between the user and the contacts.

25. The device of claim 24 wherein the means are further for presenting a prioritized list of the contacts to the user based on the likelihoods of imminent communication.

26. The device of claim 24 wherein the context information includes at least one of: contact present location, contact historical location, time of day, day of week, day of year, holiday/non-holiday, a historical communication pattern of the user with at least some of the contacts, a historical communication type for communications between the user and a particular contact of the contacts, a calendared event, security settings associated with the contacts, frequencies of communication with each of the contacts, the frequencies of communication with each of the contacts combined with location of the mobile telecommunications device, a relationship between the user and each of the contacts, type of contact, present active application of the mobile telecommunications device, a user preference, a contact's preference setting, or a contact's permission setting.

27. The device of claim 24 wherein the means are further for organizing stored communications based on the determined likelihoods of imminent communication.

28. The device of claim 24 further comprising a network interface communicatively coupled with the means and wherein the means are further for mining the context information from a wide area network via the network interface.

* * * * *